UNITED STATES PATENT OFFICE.

CHAS. F. DUPPER, OF BRIDGEPORT, CONNECTICUT, ASSIGNOR TO HIMSELF, JOHN BENZ, AND JULIUS HACKERT, OF SAME PLACE.

IMPROVED ARTIFICIAL IVORY.

Specification forming part of Letters Patent No. 51,109, dated November 21, 1865.

*To all whom it may concern:*

Be it known that I, CHARLES F. DUPPER, of Bridgeport, in the county of Fairfield and State of Connecticut, have invented a new and Improved Artificial Ivory; and I do hereby declare that the following is a full, clear, and exact description thereof, which will enable others skilled in the art to fully understand and make use of the same.

This invention relates to a composition of bone-dust with certain other ingredients, whereby said bone-dust is bleached and transformed into a pliable mass which can be readily pressed into molds of any desired description, and from which billiard-balls and other articles can be made equally as hard and durable as such balls or other articles made of real ivory.

The ingredients which I use for the purpose of preparing my composition are bone-dust, sulphuric acid, boiling water, alum, and zinc-white, and I mix these ingredients together in about the following proportion: bone-dust, sixteen ounces; sulphuric acid, four ounces; boiling water, sixteen ounces; alum, one ounce; zinc-white, one ounce. When the boiling water and sulphuric acid are added to the bone-dust it forms a white plastic mass, and by the addition of alum and zinc-white this mass is rendered tough. Before the mass sets it can be pressed into molds, and billiard-balls or other articles of any desired description can be produced. Originally the mass thus obtained is perfectly white, all the impurities being separated from the bone-dust by the action of the acid and boiling water, and billiard-balls or other articles of a snowy white can be produced; but, if desired, the mass, before being pressed into the molds, can be mixed with any desired coloring substance, and articles of any desired color can be produced.

Experiments which I have made with billiard-balls made from my composition show that the same are fully equal to ivory in every respect; they are hard, tough, and elastic, and parties not acquainted with the fact are hardly able to distinguish my balls from ordinary billiard-balls.

I claim as new and desire to secure by Letters Patent—

The within-described composition for artificial ivory, made of the ingredients herein specified, and mixed together in the manner and about in the proportion set forth.

CHARLES F. DUPPER.

Witnesses:
   M. M. LIVINGSTON,
   C. L. TOPLIFF.